United States Patent [19]
Jacquemet et al.

[11] Patent Number: 6,117,561
[45] Date of Patent: *Sep. 12, 2000

[54] MIXTURE OF POLYOLEFIN AND OF POLYAMIDE ALLOY AND METHOD FOR PRODUCING IT

[75] Inventors: Régis Jacquemet, Evreux; Jean-Claude Jammet, Serquigny; Marie-Pierre Corbic-Bellinger, Houilles; Dominique Basset, Bernay; Bruno Echalier, Paris, all of France

[73] Assignee: Elf Atochem S.A., Puteaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,329

[22] PCT Filed: Oct. 28, 1996

[86] PCT No.: PCT/FR96/01683

§ 371 Date: Dec. 16, 1997

§ 102(e) Date: Dec. 16, 1997

[87] PCT Pub. No.: WO97/15621

PCT Pub. Date: May 1, 1997

[30] Foreign Application Priority Data

Oct. 27, 1995 [FR] France .................................. 95 12701
Jul. 19, 1996 [FR] France .................................. 96 09148

[51] Int. Cl.⁷ ..................................................... C08L 77/00
[52] U.S. Cl. ..................................... 428/475.5; 428/474.4; 525/66; 525/179
[58] Field of Search .................. 525/179, 66; 428/475.5, 428/474.4

[56] References Cited

U.S. PATENT DOCUMENTS

| 4,950,513 | 8/1990 | Mehra | 428/36.7 |
| 4,950,515 | 8/1990 | Mason et al. | 428/36.92 |
| 4,988,764 | 1/1991 | Nishio et al. | 525/66 |
| 5,008,332 | 4/1991 | Sano et al. | 525/92 |
| 5,073,590 | 12/1991 | Abe et al. | 524/449 |
| 5,091,478 | 2/1992 | Saltman | 525/179 |
| 5,330,696 | 7/1994 | Mehra | 264/141 |
| 5,420,198 | 5/1995 | Papazoglou et al. | 525/66 |

FOREIGN PATENT DOCUMENTS

| 0622183 | 1/1982 | European Pat. Off. |
| 595706 | 1/1985 | European Pat. Off. |
| 1-118428 | 5/1989 | Japan |
| 2-243320 | 9/1990 | Japan |
| 3-237143 | 10/1991 | Japan |
| 4-119809 | 4/1992 | Japan |
| 5-104689 | 4/1993 | Japan |

*Primary Examiner*—Ana Woodward
*Attorney, Agent, or Firm*—Pennie & Edmonds LLP

[57] ABSTRACT

There is provided a mixture comprising: (i) a matrix A comprising a polyolefin (A1) and/or a functionalized polyolefin (A2); and (ii) a dispersed phase comprising an alloy B of polyamide (B1) having a polyamide matrix, comprising for example a polyamide (B1), a functionalized polyolefin (B2) and optionally a polyolefin (B3). A method for producing same is disclosed and comprises mixing the constituents of matrix A and a ground product of a multi-layer film comprising at least one layer of alloy B.

39 Claims, 2 Drawing Sheets

MIXTURE OF POLYOLEFIN AND OF POLYAMIDE ALLOY AND METHOD FOR PRODUCING IT

The present invention relates to a mixture of polyolefin and of polyamide alloy, and to the process for making it.

BACKGROUND ART

U.S. Pat. No. 4,444,817 and U.S. Pat. No. 4,410,482 (Subramanian) disclose shaped articles comprising a polyolefin matrix and a dispersed polyamide phase in the form of thin sheets or plates, the latter however being produced partly by mixing of the polyolefin and polyamide, and partly by the transformation into web or hollow body form, as these operations lead to the polyamide being stretched into thin sheet or plate form. The product comprises a polyethylene matrix containing thin copolyamide 6/6,6 plates or sheets (in other words the polymer produced by condensation of hexamethylene diamine, adipic acid and caprolactame). It is also necessary to add a compatibilizer, this being grafted (using fumaric acid) polyethylene causing the thin plates or sheets to adhere to each other and/or to the matrix, as otherwise the objects have no mechanical propertied or cannot even be manufactured. This compatibilizer is present between the thin plates or sheets and the matrix, and bonds them together (U.S. Pat. No. 4,410,482) or is present between the thin plates or sheets and is responsible for the latter adhering together (U.S. Pat. No. 4,444,817).

According to these references, the 6/6,6 copolyamide is prepared in the form of cubic pellets of 3 to 4 mm on a side. The cubic 3 to 4 mm on a side pellets, polyamide and compatibilzer in the form of 2 to 3 mm on a side pellets are mixed in the dry state until a homogeneous mixture is obtained. Following this, the mixture is heated to above the highest melting temperature of the three components, taking care not to provide an intimate mixture as, otherwise, the copolyamide comes out in the form of spherical nodules rather than thin sheets or plates. The principle consists in subjecting this heterogeneous mixture to shear and/or stretching forces. The effects of extruding and blowing the parison are combined. Following this, it is cooled down to below the lowest melting temperature of the components. The copolyamide can be replaced by polyester or polycarbonate. This technique requires very strict control of the operating conditions, of the polymers and of their melt index to ensure it is reproducible. If stretching is insufficient, thin sheets or plates are not obtained, and if the mixture is too homogeneous, nodules and not thin plates or sheet result. Only the structure with thin plates or sheets provides barrier properties towards unleaded gasoline, compared with other structures.

WO 95/11939 discloses the same principle, but the thin plates are inside a mixture of 6/6,6 copolyamide and phenolic resin. As above, this structure is difficult to reproduce.

EP-A-0,622,183 discloses multi-layer films one of the layers of which consists of a recycled product of polyamide and polyolefin and a binder, the recycled product constituting 60 to 98% by weight of the layer. The recycled product can be a "regenerated product" (granulated after melting with additives), a "regranulated product" (granulated after melting without additives) or an "agglomerate" (without melting). The binder can be a functionalized polyolefin, for example a polyolefin functionalized with maleic anhydride. This document does not mention barrier properties or improved mechanical properties, nor does it describe the physical characteristics of the mixture; additionally, the manufacturing process requires several layers to be present in order to obtain a product suitable for use.

Thus, these references disclose mixtures comprising a polyolefin and a polyamide which are, on the one hand, in the form of a polyolefin matrix containing polyamide plates or sheets and, on the other hand, in the form of multilayer films.

However, the references mentioned above do not provide a mixture which always has good barrier properties combined with good mechanical properties; additionally, the references do not provide a process which can easily be carried out.

The invention provides a solution to these problems and additionally provides supplementary advantages.

SUMMARY OF THE INVENTION

According to a first aspect, this invention provides a mixture comprising:
(i) a matrix A constituted by a polyolefin (A1) and/or a functionalized polyolefin (A2); and
(ii) a dispersed phase constituted by an alloy B of polyamide (B1) having a polyamide matrix.

Such mixtures have barrier properties and good mechanical properties.

In one embodiment, the alloy B of polyamide comprises a polyamide (B1), a functionalized polyolefin (B2) and, optionally, a polyolefin (B3).

In another embodiment, matrix A is constituted by 100 to 75% by weight of polyolefin (A1) and 0 to 25% by weight of polyolefin (A2).

In another embodiment, the polyolefin (A1) is selected from polyethylene or polypropylene.

In a further embodiment, the polyamide (B1) is PA6 or PA6,6.

In another embodiment, the functionalized polyolefin (B2) is an ethylene-alkyl (meth)acrylate-maleic anhydride copolymer.

In one embodiment, the functionalized polyolefin (B2) is a polymer comprising olefin units and functions allowing small polyamide chain or polyamide oligomer grafting, condensed with polyamides or monoamino polyamide oligomers.

In an embodiment, the polyolefin (B3) is selected from polyolefins (A1), and the SBS, SIS, EPR and EPDM copolymers.

In another embodiment, matrix A and alloy B are present in A/B weight ratios of 5/95 to 95/5, preferably 90/10 to 50/50.

In an embodiment, the dispersed phase is in the form of platelets.

The invention also provides multi-layer structures comprising a layer or film of the mixture according to the invention.

In a second aspect, the invention provides a method for producing a mixture according to the invention, notably by recycling multi-layer films comprising a polyamide alloy having a polyamide matrix In one embodiment, the method comprises the step of mixing the constituents of matrix A and alloy B.

In a further embodiment, the method comprises the step of mixing the constituents of matrix A and a ground product of a multi-layer film comprising at least one layer made of alloy B

DETAILED DESCRIPTION

BRIEF DESCRIPTION OF DRAWINGS

The invention will now be described in more detail below, with reference to the drawings in which.

Mixture According to the Invention

Figure 1A:
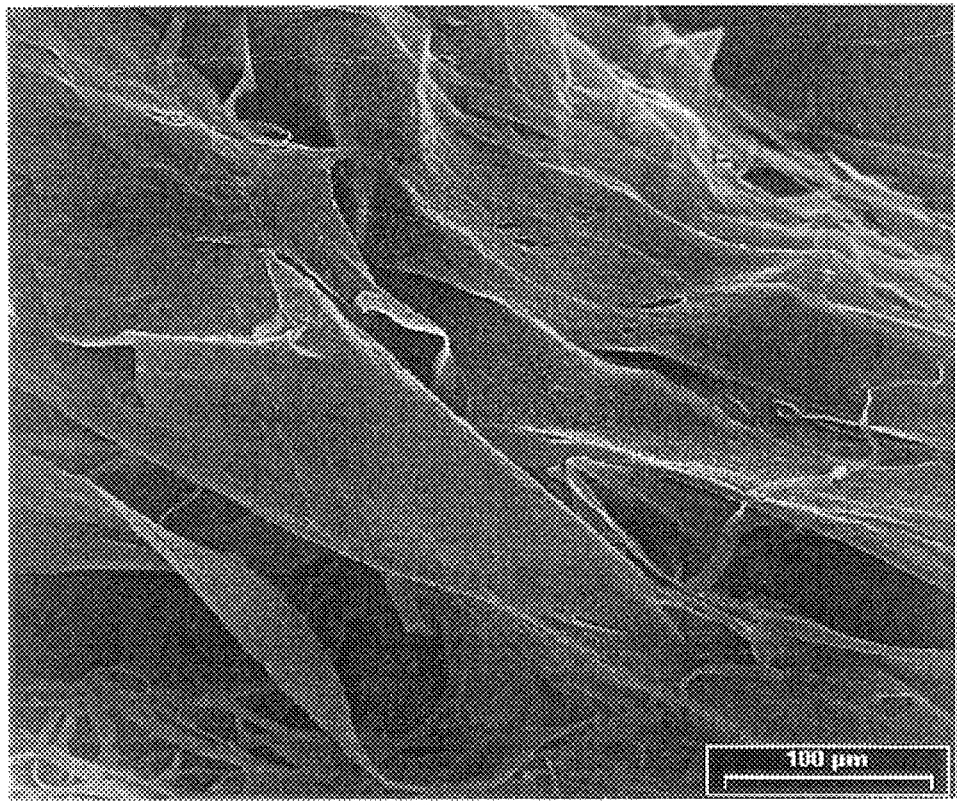
FIGS. 1a and 1b are microphotographs of the dispersed phase in the form of thin plates or sheets of a mixture according to the invention.

In this specification, the term "matrix A constituted by a polyolefin (A1) and/or a functionalized polyolefin (A2)" stands for any single-phase polyolefinic mixture.

In mixtures according to the invention, matrix A and the alloy B are for example present in A/B weight ratios of 5/95 to 95/5, preferably 90/10 to 50/so, particularly from 90/10 to 65/35.

The term "polyolefin (A1)" stands for homopolymers or copolymers of alpha-olefins or diolefins. Exemplary olefins are typically ethylene, propylene, butene-1, octene-1 and butadiene.

These can be mentioned as A1 examples:

polyethylene (PE), polypropylene (PP), copolymers of ethylene with alpha-olefins such as propylene, butene, hexene or octene;

copolymers of ethylene with one or several product(s) selected from: (i) unsaturated carboxylic acids and salts and esters thereof; and (ii) vinylic esters of saturated carboxylic acids such a vinyl acetate. The copolymers mentioned above can be copolymerized in a random or sequenced manner and have a linear or branched structure. By way of example, polyethylene (HDPE, LDPE, LLDPE, VLDPE or obtained by metallocene catalysis); polypropylene; ethylene/alpha-olefin copolymers; ethylene/vinyl acetate (EVA) copolymers; ethylene/alkyl (meth)acrylate copolymers can be used.

Further, the above polyolefins can be cross-linked using any suitable method or agent (peroxy, etc.).

The term "polyolefin" also covers mixtures of several of the polyolefins mentioned above. These polyolefins (A1), notably polypropylene, could also have added thereto a polymer of type SBS, SIS, SEBS, EPR or EPDM, optionally functionalized with maleic anhydride.

The molecular weight of the polyolefins can vary to a large extent as those skilled in the art will understand and can, for example, be between 1,000 and 1,000,000 g/mole.

The term "functionalized polyolefin (A2)" stands for polymers of olefins and reactive units (functionalities); such reactive units can be acid, anhydride or epoxy functions.

By way of example, the above-cited polyolefins (A1) can be mentioned, comprising the preceding reactive functions introduced either by chemical reaction, by grafting or by co- or ter-polymerization of unsaturated monomers having these functions.

These can be mentioned as examples of such monomers: unsaturated carboxylic acids such as (meth)acrylic acid, salts and esters thereof; unsaturated dicarboxylic acid anhydrides such as maleic anhydride; and unsaturated expoxides such as glycidyl (meth)acrylate. The carboxylic acids can be partially or fully neutralized using metals (Zn, etc.) leading to ionomers.

The functionalized polyolefin (A2) can be the following (co)polymers, grafted with maleic anhydride or glycidyl methacrylate, in which the grafting rate is for example from 0.01 to 5% by weight:

PE, PP, copolymers of ethylene with propylene, butene, hexene or octene containing, for example, 35 to 80% by weight ethylene;

ethylene, vinyl acetate (EVA) copolymers containing up to 40% by weight vinyl acetate;

ethylene and alkyl (meth)acrylate terpolymers containing up to 40% by weight non-ethylene alkyl(meth)acrylate;

ethylene, vinyl acetate (EVA) and alkyl (meth)acrylate terpolymers, containing up to 40% by weight non-ethylene comonomers.

The functionalized polyolefin (A2) is advantageously a co- or ter-polymer of at least one of the following units: (1) ethylene, (2) alkyl (meth)acrylate or (meth) acrylic acid or saturated carboxylic acid vinyl ester and (3) maleic anhydride or glycidyl (meth)acrylate.

As an example of functionalized polyolefins of the latter type, the following copolymers can be mentioned in which ethylene represents preferably at least 60% by weight and where each non-ethylene monomer represents, for example, 0.1 to 10% by weight of the copolymer:

ethylene/alkyl (meth)acrylate or methacrylic acid/maleic anhydride or glycidyl methacrylate terpolymers;

ethylene/vinyl acetate/maleic anhydride or glycidyl methacrylate terpolymers;

ethylene/vinyl acetate/alkyl (meth)acrylate or methacrylic acid/maleic anhydride or glycidyl methacrylate tetrapolymers.

The term "alkyl (meth)acrylate" stands for alkyl groups containing from one to eight carbon atoms, such as methyl, ethyl, butyl and 2-ethylhexyl alkyl, methacrylates and acrylates.

Moreover, these polyolefins can also be cross-linked using any suitable process or agent (di-epoxy diacid, peroxy, etc.).

An A2 component comprising mixtures of A-type polymers is also envisaged.

The molecular weight of these functionalized polyolefins can also vary greatly, as those skilled in the art will understand.

The weight ratio (A1)/(A2) when polyolefin A2 is present can vary greatly, for example from 0/100 to 30/70.

In the present application, the term "polyamide alloy B having a polyamide B1 matrix" stands for products comprising a polyamide forming a matrix in which another polymer is dispersed, for example in the form of nodules, of variable shape and diameter. Such a dispersed phase can be for example constituted of polyolefin and/or SBS, SIS, EPR or EPDM type copolymer and/or another polymer.

The term "polyamide alloy" notably covers alloys of a polyamide (B1), of a functionalized polyolefin (B2) and, optionally a polyolefin (B3), the functionalities present on polyolefin (B2) ensuring compatibility with the polyamide.

The ratio (B1)/(B2)/(B3) in the alloy can vary over a wide range, as those skilled in the art will understand. For example, alloy B comprises, in % by weight, for example 30 to 95%, preferably 55 to 70%, of (B1), 5 to 20% of (B2), and 5 to 45%, preferably 20 to 30%, of (B3).

In this present application, the term "polyamide (B1)" stands for the condensation products:

of one or several alpha-omega-amino-acids such as those containing more than 5 carbon atoms, for example from 6 to 12 carbon atoms; examples of such amino acids are aminocaproic, amino-7-heptanoic, amino-11-undecenoic and amino-12-dodecanoic acid; or of one or several lactams corresponding to the above amino-acids; examples of such lactams are caprolactam, oenanlactam and lauryllactam; or of one or several substantially stoichiometric combinations of one or several aliphatic and/or cycloaliphatic and/or aromatic-aliphatic diamines, or salts thereof, with one or several aliphatic or aromatic carboxylic diacids or salts thereof; examples of such diamines are hexamethylenediamine, dodecamethylenediamine, metaxylylenediamine, bis(4-aminocyclohexyl)methane (BACM), bis(3-methyl-4-amino-cyclohexyl)methane (BMACM) and trimethylhexamethylenediamine; examples of diacids being terephthalic, isophthalic, adipic, azelaic, sebacic, suberic and docedanedicarboxylic acid; or any mixture of the above monomers; and any mixture of the resulting condensation products, optionally with other polymers compatible with the polyamides.

By way of example, the polyamide is PA6, PA6,6, PA6,10, PA11, PA12, PA6,12 and PA12,12. The molecular weight of the polyamides can vary greatly, as those skilled in the art will understand.

The term "functionalized polyolefin (B2)" stands for polymers of olefins and reactive units (functionalities); such reactive units are the acid, anhydride, epoxy or amino functions.

This functionalized polyolefin (B2) can be selected from the functionalized polyolefins (A2) already mentioned.

This functionalized polyolefin (B2) can also be selected from the grafted copolymers constituted by at least one monoamino oligomer of polyamide and an alpha-monoolefin (co)polymer grafted with a monomer able to react with the amine function of said oligomer. Such a polyolefin is described in European Patent application EP-A-0,342,066. The monoamino polyamide oligomers can be obtained by polycondensation of an amino acid or by polyaddition of a lactam in the presence of a monofunctional limiter such as, for example, laurylamine or oleylamine. Preferred amino acids or lactams are caprolactam, amino-11-undecanoic acid or lauryllactam. Polyamide oligomer or polyamide chain grafting is preferably carried out in the molten state. One example of such a polyolefin (B2) is a sequenced copolymer of propylene and ethylene (weight ratio 75/25 to 95/5 for example), grafted with a monoamino PA6 oligomer (of number average molecular weight Mn from 1500 to 4000 to 40005 for example), optionally functionalized with maleic anhydride (at a rate of 0.5 to 2.5% by weight for example). Such products are also described in U.S. Pat. No. 5,342,886.

The "polyolefin (B3)" can be selected from the polyolefins (A1) mentioned above.

Polyolefin (B3) can also be selected from:

block copolymers based on styrene, and notably those constituted by polystyrene and polybutadiene (SBS) sequences, polystyrene and polyisoprene (SIS) sequences, polystyrene and poly(ethylene-butylene) sequences (SEBS);

elastomers or copolymers known as "rubber", such as EPR (ethylene/propylene rubber) or EPDM (ethylene/propylene/diene monomer rubber), optionally functionalized with maleic anhydride.

Preferably, (B3) is of the same type as (A1). For example, if (A1) is a polyethylene, for example HDPE or LLDPE, then (B3) is also a polyethylene, for example HDPE, LLDPE, VLDPE or an ethylene/alkyl (meth)acrylate copolymer with a majority of ethylene. Or if (A1) is a polypropylene, (B3) is a polypropylene.

Even if B3 and A1 are of the same type, it can be advantageous if they are slightly different in density or viscosity or rheological behavior.

Preferably, (B2) is essentially constituted of a part similar to (B3). For example, if (B3) is a polypropylene, (B2) is a grafted polypropylene or an ethylene/propylene copolymer with a majority of propylene, grafted with maleic anhydride and then condensed with caprolactam or lauryllactam oligomers. For another example, if (B3) is a polyethylene, (B2) is an ethylene/alkyl (meth)acrylate/maleic anhydride terpolymer.

Alloys useful in the invention are, for example, described in French patent application 2,291,225 and European patent applications 0,342,066 and 0,218,665.

Alloys B are for example (in % by weight):

1)
55 to 70% of PA-6;
5 to 15% of an ethylene propylene copolymer, with a majority of polypropylene, grafted with maleic anhydride then condensed with monoamino oligomers of caprolactam;
made up to the total of 100% with polypropylene.

2)
55 to 70% of PA-6;
5 to 15% of at least one ethylene terpolymer with (i) an alkyl (meth)acrylate and (ii) an unsaturated carboxylic acid anhydride (for example prepared by high pressure radical catalysis at 300 to 3000 bar);
made up to a total of 100% with polypropylene.

3)
55 to 70% of PA-6;
5 to 15% of at least polyethylene or an ethylene copolymer with an alpha-olefin grafted with maleic anhydride or glycidyl methacrylate;
made up to a total of 100% with polypropylene.

Production Process

All the polymers mentioned above can be prepared by methods known in the art. The alloys B can be prepared by conventional techniques for thermoplastic mixtures.

The mixtures according to the invention can be prepared using several processes.

In a first embodiment, the process for producing a mixture according to the invention comprises the step of mixing the constituents of the polyolefin matrix A and the alloy B; such mixing can for example be done in an extruder at the feed hopper or at any other level. It should be noted that the alloy is mixed as such with the constituents of the polyolefin matrix; B is introduced in alloy form.

In a second embodiment, the process for producing a mixture according to the invention comprises the step of melting a multi-layer film comprising at least one layer of the constituents of the polyolefin matrix A and at least one alloy B layer. The respective constituents of the multi-layer film will then form, under the effect of melting, a mixture according to the invention, in other words a polyolefin matrix and a dispersed phase comprising alloy, the functional polymers optionally present being able to be either at the alloy/polyolefin interface or in solution in the polyolefin. During implementation of this process, it is also possible to add a supplement comprising another polyolefin (A1) and/or functionalized polyolefin (A2). The multi-layer film may also be available in the form of a ground or pulverized product.

In a third embodiment, the process for producing a mixture according to the invention comprises the step of mixing the constituents of the polyolefin matrix A and the ground product of a multi-layer film comprising at least one layer of alloy B. The comments in the preceding paragraph apply with some necessary changes. One example of such a process is, for example, of extruding the ground product of a multi-layer film comprising at least one layer of alloy B mixed with a polyolefin A1.

The applicant has discovered that mixtures according to the invention can be prepared by simply mixing ingredients (A) and (B) without taking any particular precautions regarding the size of the granular material, the mixing device or the mixing conditions. (A) can be supplied in the form of its individual constituents whereas (B) is supplied in alloy form (at least the majority thereof).

The present invention thus allows such single-layer alloy films, as well as multi-layer films comprising an alloy layer to be recycled in a production process for a mixture according to the invention. Scrap recycling is in point of fact an increasing need.

Multi-layer films, notably polyamide alloy multi-layer films (polyamide matrix)/binder/polyolefin are indeed used more and more in various industrial fields. Such multi-layer films are produced by extrusion and notably by blow extrusion of sleeves. During manufacture, the sleeve is cut at the two edges before separating the two films at wind-up level, in order to simultaneously constitute two rolls of film. This leads to film scrap production (the edges). Moreover, during extrusion of the sleeve, it is necessary to optimize the blow extrusion conditions in order to obtain maximum stability of the bubble, in order to obtain homogenous characteristics. When starting up, scrap film is produced (due to irregularities in thickness, to creases, defects in appearance, etc.). Scrap is also generated during other processes, for example the cast-film process.

There is thus a need to recycle off-cuts or scrap obtained when manufacturing such multi-layer films, notably those obtained by processes involving blowing and cast-film. Such recycling needs also exist in other types of industry.

From the above, it will be understood that the multi-layer films that are recycled can consist of:

(i) a layer of alloy and a layer of polyolefin in which a grafted polyolefin or a binder have been incorporated in a sufficient amount; and (ii) a layer of alloy, a layer of polyolefin and an intermediate binder layer.

The multi-layer films that can be recycled are obtained using conventional methods, in other words coextrusion. Each layer of multi-layer film can contain conventional additives. Moreover, additional layers may be present in the multilayer films. Thickness is comprised within a wide range, for example between 20 and 300 $\mu$m. Also the proportions of the various layers in percentage of multi-layer film final thickness can also vary over a wide range. For example the alloy/polyolefin thickness ratio is between 9/1 and 1/9, advantageously between 3/1 and 1/3, while the binder, if present, can represent up to 30%, advantageously up to 20% of final thickness. Various mixtures of single and/or multi-layer films can also be recycled.

The ground multi-layer film product, which could also be called "regrind" is obtained by conventional size-reduction or grinding techniques, using knife grinders. The flakes obtained after passage through the grinder can be used as such for the ground material, or can be subjected to a densification step to produce a granular product. However, the term "ground product" can also comprise scrap directly originating from multi-layer film production processes, and notably comprises all forms of recycled material such as described in European patent application EP 0,622,183.

Industrial Application

The applicant, without wishing to be bound by this, believes that the mixtures of the invention are present in the form of a polyolefin matrix in which essentially two-dimensional very fine platelets, all parallel to each other, are present. The platelets comprise at least a polyamide.

The mixtures according to the invention are used in the form of webs, film, or hollow bodies such as tubes, bottles or gasoline tanks; the platelets are then perpendicular to the thickness of the web, film or wall of the hollow body.

The applicant has discovered that the mixtures according to the invention have barrier properties towards gases such as for example oxygen, pentane, $CO_2$, hydrogen and fumigants, for example methyl bromide $CH_3Br$. This particularly holds for mixtures in which (A) is a polypropylene-based matrix and (B) is a mixture based on PA-6 (B1), ethylene propylene copolymer with a majority of propylene grafted with maleic anhydride and then condensed with monoaminated oligomers of caprolactam (B2) and polypropylene (B3).

Thus, a 2 mm thick sheet of the mixture of the invention containing 20 to 30% of (B) is 10 times less permeable to hydrogen than the same sheet consisting of (A) alone and 2 to 10 times more permeable than the same sheet consisting of (B) alone. The mixtures of the invention are used to produce gas barrier molded objects. These products are weldable and electrically insulating.

The mixtures of the invention also have barrier properties towards solvents, herbicides, insecticides and concentrated extracts, whether alcohol-based or not.

Unlike HDPE bottles habitually employed for phytosanitary products, bottles made from the (A) and (B) mixtures of the invention are not deformed, even after 300 hours.

Moreover, compared to the same bottles of the prior art, bottles obtained by the invention offer barrier properties towards fragrances, which is of value in food packaging, for example, packaging flavored milk.

The invention also relates to multi-layer structures comprising a layer or a film made of the mixture according to the invention.

These structures can be:

Polyolefin/mixture of (A) and (B), or

Polyolefin/mixture of (A) and (B)/Polyolefin.

If the polyolefins comprising the above structures are very different from the polyolefin matrix (A), a binder can be provided between the layers.

Such structures are useful for providing packagings or blow-molded hollow bodies such as bottles.

EXAMPLES

The invention is illustrated by the examples that follow, provided solely by way of illustration and which should not be considered as limiting the scope of the invention.

Example 1

This example shows, firstly, the possibility of recycling multi-layer films comprising a layer of polyamide/polyolefin alloy and, secondly, the improved mechanical properties of mixtures according to the invention.

A multi-layer film is produced of total thickness 70 $\mu$m distributed as follows: outer layer/binder/inner layer: 30/10/30. The outer layer is polyamide or polyamide-based alloy, whereas the inner layer is polyolefin.

The polyolefin is low density polyolefin (LDPE) of Melt Index (MI) 0.3; the polyamide is PA6 of MI=15–17; the alloy is an Orgalloy A, which is a PA6/PE/terpolymer alloy, said terpolymer comprising 65% by weight PA6 of MI=15–17, 27% by weight LDPE of MI=1 (at 190° C.), and 8% of an ethylene/butyl acrylate/maleic anhydride copolymer with 5.5% acrylate and 3.6% anhydride of MI=5; the binder is a linear low density polyolefin (LLDPE) grafted with maleic anhydride, sold by Elf Atochem under the name OREVAC®.

The film is produced with a Barmag extruder filming apparatus operating with the following temperature profiles:

PE: 230–250° C., binder: 220–230° C., alloy: 240–260° C.,

PA6: 240–250° C., head temperature: 250° C.

Film forming operating conditions are as follows:

die diameter: 150 mm;

gap: 0.7 mm;

speed of draw: 8.7 m/min;

expansion ratio: 2.1;

flat sleeve width: 500 mm.

Implementation was continued until about 100 kg of film was obtained, after start-up and optimizing extruder settings.

The films thus obtained, in reel form, are cut up and then ground into flakes in a Pallman grinder. This is a hollow-rotor grinder with six knives three of which are stationary. In the case of the Orgaloy A/binder/PE film, the flakes derived therefrom exhibited a phenomenon known as curling, along with a fairly low bulk density. In the case of the Orgalloy A/binder/PE film the flakes had a straight section with an associated fragmented appearance. This latter film gave a higher bulk density than that of the previously described film.

These flakes were then baked at 60° C. for 24 hours in order to drive out any traces of moisture which would lead to formation of small bubbles. Following this, these baked flakes were extruded with PE in a Kaufman extruder filming apparatus.

Film forming operating conditions were as follows:

die diameter: 150 mm;

gap: 0.8 mm;

speed of draw: 9 m/min;

expansion ratio: 2.12;

flat sleeve width: 500 mm.

The Kaufman extruder temperature profiles were those associated with PA6 or Orgalloy A alloy, in other words:

For tests with PA6/binder/PE film flakes: inside extruder: 240–250° C.; at head: 240° C.;

For tests with Orgalloy/binder/PE film flakes: inside extruder: 230–250° C.; at head: 240° C.;

Using this extruder, 4 single-layer films of average thickness 50 μm are produced, their compositions by weight being given below, the PE added to the ground matter being LDPE of MI=0.3:

$A_F$ 50% PE+50% ground product of (Orgalloy A/binder/PE)

$B_F$ 25% PE+75% ground product of (Orgalloy A/binder/PE)

$C_F$ 50% PE+50% ground product of (PA6/binder/PE)

$D_F$ 25% PE+75% ground product of (PA6/binder/PE)

No problems occurred during manufacture, and there was no segregation (no arch formation at the feed discharge). The films obtained are fairly transparent, milky white, strong and moisture-free. The films obtained can have any required thickness, for example between 10 and 150 μm.

In the case of the PA6/binder/PE films, the throughput was 30 kg/h for screw speeds of 110 rpm and 60 rpm for compositions $C_F$ and $D_F$ respectively. In the case of the Orgalloy A/binder/PE films, throughput was 60 kg/h for screw speeds of 110 rpm and 60 rpm for the compositions $A_F$ and $B_F$ respectively.

Thus, the polyamide alloy leads to unexpected results compared to PA6. In other words, a material throughput that is extremely high (with Orgalloy, the throughput obtained is twice that for PA6), excellent extrudability and excellent ability to form films. Moreover, in the case of the alloy such as Orgalloy, it will not be necessary to extrude it with a special screw, such as a polyamide screw. Therefore, polyolefin extrusion devices need not be adapted to receive multi-layer Orgalloy/binder/PE film in ground form. Thus, the mixtures according to the invention are manufactured without any problem with a conventional PE screw.

Mechanical test results (tensile strength, tear strength, dart impact test) carried out on a PE film and on films $A_F$, $B_F$, $C_F$ and $D_F$ are given in Table 1 below. These results show the surprising superiority of recycled films obtained from multi-layer alloy/binder/PE films compared to PA/binder/PE films, for example, regarding surface appearance properties and the mechanical properties of the final recycled films.

Dart test: better shock resistance was obtained for the films $A_F$ and $B_F$ according to the invention;

Tensile strength: better isotropy was obtained between the directions parallel and perpendicular to extrusion with the films $A_F$ and $B_F$;

Tear resistance: better tear resistance in the direction parallel to extrusion was obtained with films $A_F$ and $B_F$.

Example 2

This example shows the barrier properties of mixtures according to the invention.

Various 0.5 liter bottles were manufactured with different polymers on a Serta machine, the extrusion conditions being adapted as a function of the specific characteristics of the polymers.

Operating conditions were conventional, for example those given in the example above.

The various polymers tested were the following:

HDPE 1: a high density polyethylene of MI=0.3 (190° C., 2.16 kg);

PP1: a polypropylene of MI=2;

PA6 1: a polyamide 6 of MI=3 (235° C., 2.16 kg)

Orgalloy A: identical to that for the preceding example;

Orgalloy B: identical to Orgalloy A but with a MI of 0.6 and containing 2% of an impact modifier of core-shell structure with acid functions.

For each bottle, White Spirit permeability (WS), pendimethalin-based herbicide (Melkior) permeability and a β-cypermethrine insecticide in a Solvesso 200 solution permeability were measured using a gravimetric method consisting of monitoring, at 23° C. and 50% relative humidity, the weight of each bottle containing 100 cc of product, over 300 hours.

These results are given in Table 2 below.

Example 3

This example consists of photomicrographic analysis of a mixture according to the invention consisting of a mixture of PE and alloy, respectively, of HDPE 1 and Orgalloy A from the preceding examples, in a weight ratio of 85/15 (FIG. 1). For comparison purposes, analysis was also done on a mixture of PE and polyamide, respectively the HDPE 1 and PA6 1 of the previous examples, in a weight ratio of 90/10 (FIG. 2).

Selective phase extraction was carried out, comprising the steps of:

extracting the PE matrix with boiling xylene;

observation of the flakes with a scanning electronic microscope.

Figure 1B:
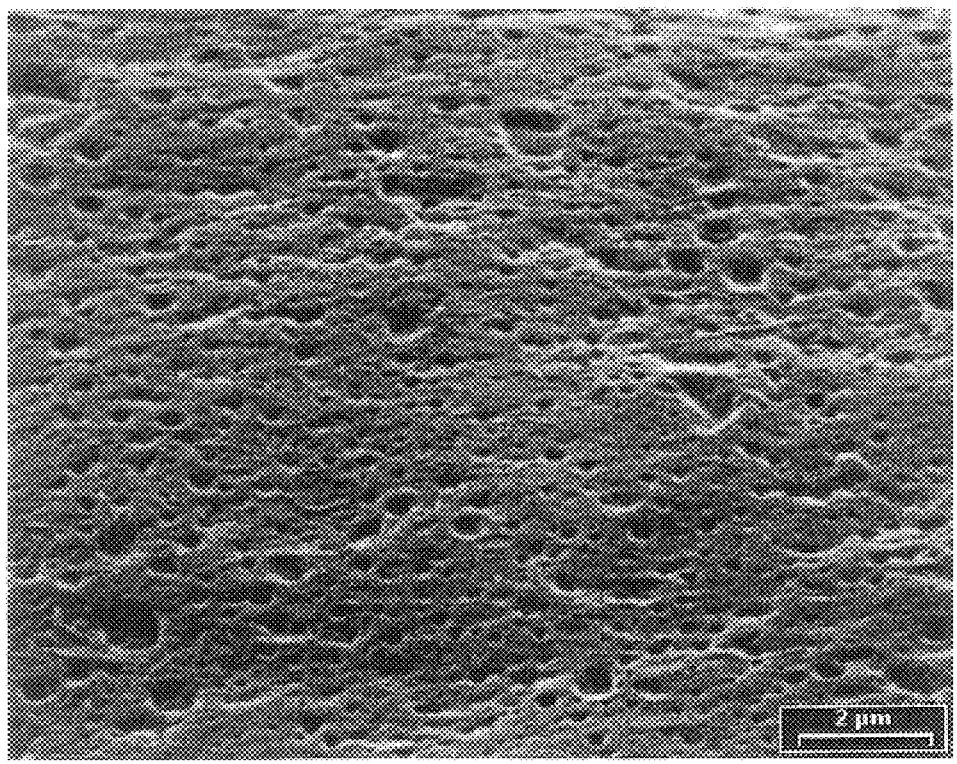
Figure 2A:
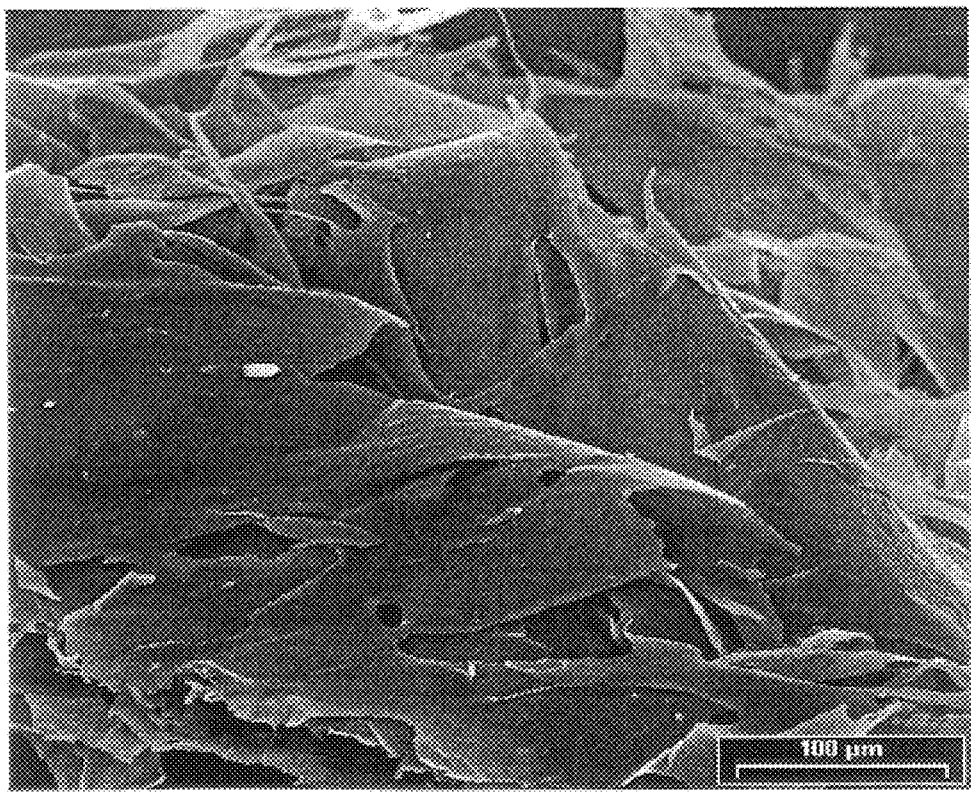
FIGS. 2a and 2b are microphotographs of the dispersed phase in the form of thin plates or sheets in a mixture according to the prior art.
Figure 2B:
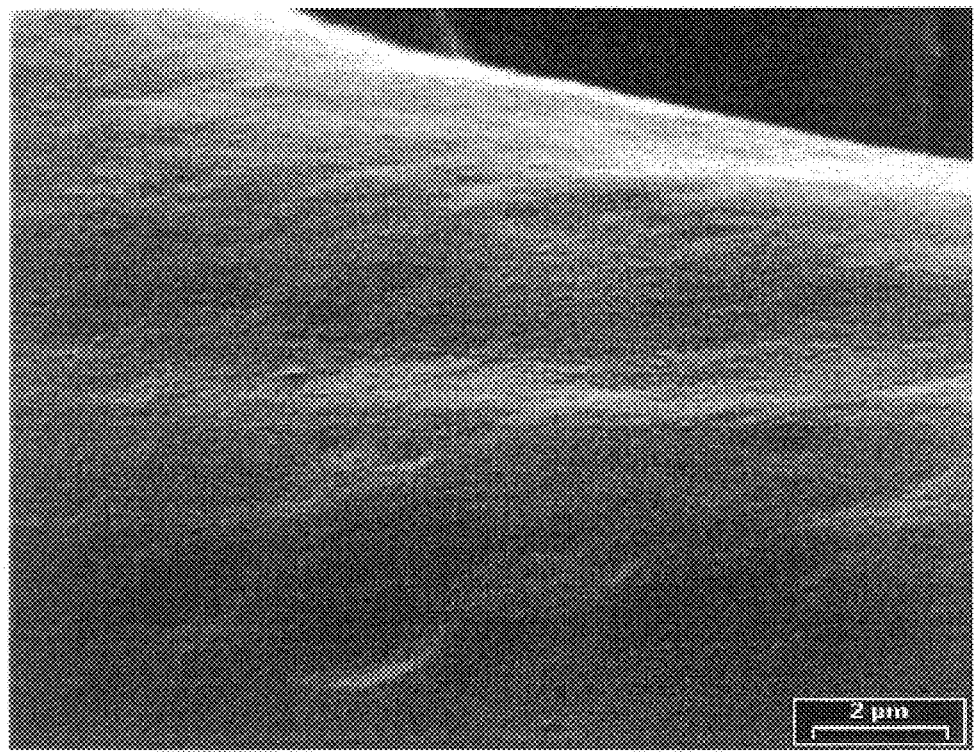

The two structures had different morphologies although, in each case, the dispersed phase in the mixtures had the form of platelets (small plates) (FIGS. 1a and 2a). Effectively, as FIG. 1b clearly shows, there can be distinguished, on the surface of the platelets of the mixture according to the invention, cavities produced by extraction of PE nodules located on the surface of the alloy; in FIG. 2b, however, one can note a perfectly smooth surface for the platelets of PA6.

Moreover, material from the platelets of the mixture according to the invention cannot be extracted with HFIP (hexafluoroisopropyl alcohol) unlike the PA6 of the PE/PA6 mixture.

Thus, alloy B remains in its alloy state, even when it forms the dispersed phase in mixtures according to the invention.

Obviously, this invention is not limited to the embodiments that have, been described but may undergo numerous variations readily available to those skilled in the art.

TABLE 1

| STANDARD | TEST | UNIT | PE | $A_F$ | $B_F$ | $C_F$ | $D_F$ |
|---|---|---|---|---|---|---|---|
| ASTM D882 narrow strip width = 15 mm; length = 50 mm; V = 500 mm/min | Stretch (parallel to extrusion direction) | | | | | | |
| | Breaking stress | Mpa | 28.6 +/− 1.2 | 24.9 +/− 1.6 | 33.9 +/− 1.6 | 28.1 +/− 1.6 | 28.1 +/− 2.1 |
| | Elongation at rupture | % | 718 +/− 19 | 478 +/− 33 | 419 +/− 26 | 340 +/− 22 | 366 +/− 26 |
| ASTM D882 narrow strip width = 15 mm; length = 50 mm; V = 500 mm/min | Stretch (perpendicular to extrusion direction) | | | | | | |
| | Breaking stress | Mpa | 22.8 +/− 0.8 | 23.4 +/− 1.3 | 23.4 +/− 1.4 | 12.3 +/− 1 | 20 +/− 0.6 |
| | Elongation at rupture | % | 918 +/− 22 | 720 +/− 30 | 588 +/− 62 | 7 +/− 0.5 | 325 +/− 76 |
| NFT 54-141 (20 mm notch) | Tear strength (constant radius sample) | | | | | | |
| | parallel to extrusion direction | N | 3.31 +/− 0.82 | 0.90 +/− 0.15 | 0.36 +/− 0.08 | 0.17 +/− 0.02 | 0.44 +/− 0.05 |
| | perpendicular to extrusion direction | N | 5.72 +/− 0.53 | 3.40 +/− 0.17 | 2.70 +/− 0.11 | 4.08 +/− 0.32 | 2.04 +/− 0.16 |
| NFT 54-109 Method A (impact below 300 g) | Impact rupture mass (for 50% rupture) | g | 153 | 294 | 238 | below 33 g | below 33 g |
| | Film thickness | μm | 53 | 53 | 39 | 55 | 59 |

Note: Value +/− standard deviation.

TABLE 2

| Composition in wt. % | Thickness in μm | Permeability (g/flask/24 h) corrected for standard thickness of 500 μm | | |
|---|---|---|---|---|
| | | WS | Herbicide | Insecticide |
| HDPE 1 | 554 | 0.19 | 0.013 | 0.073 |
| PP 1 | 557 | 0.67 | 0.003 | <0.001 |
| PA6 1 | 500 | <0.001 | 0.21 | <0.001 |
| Orgalloy A | 532 | 0.007 | 0.06 | <0.001 |
| Orgalloy B | 496 | 0.006 | nd | nd |
| HDPE 1/Orgalloy B 75/25 | 500 | 0.055 | nd | nd |
| HDPE 1/Orgalloy B 50/50 | 500 | 0.006 | nd | nd |
| HDPE 1/Orgalloy B 25/75 | 500 | 0.007 | nd | nd |
| HDPE 1/Orgalloy A 85/15 | 500 | 0.02 | 0.001 | <0.001 |
| HDPE 1/Orgalloy A 70/30 | 500 | 0.006 | nd | nd |
| HDPE 1/Orgalloy A 50/50 | 500 | 0.02 | nd | nd | nd: not determined

What is claimed is:

1. A mixture comprising:
   (i) a first matrix A comprising at least one member of the group consisting of a polyolefin (A1) and a polyolefin (A2) functionalized with at least one member of the group consisting of acid, anhydride and epoxy functions; and
   (ii) a phase in the form of platelets dispersed in the first matrix phase (i) comprising an alloy B wherein the alloy B comprises a second matrix comprising polyamide (B1) and a polyolefin (B2) dispersed therein, wherein said polyolefin (B2) is functionalized with at least one member of the group consisting of an acid function, an anhydride function, an epoxy function, and an amino function.

2. The mixture according to claim 1, in which said matrix A comprises 100% to 75% by weight of polyolefin (A1) and 0% to 25% by weight of polyolefin (A2).

3. The mixture according to claim 2, in which the polyolefin (A1) is selected from polyethylene or polypropylene.

4. The mixture according to claim 3, in which the alloy B further comprises a component (B3) alloyed with (B2).

5. The mixture according to claim 4, in which the component (B3) is selected from the group consisting of polyolefins (A1); copolymers comprising polystyrene and polybutadiene sequences (SBS); copolymers comprising polystyrene and polyisoprene sequences (SIS); ethylene/propylene rubber (EPR) and ethylene/propylene/diene monomer rubber (EPDM).

6. The mixture according to claim 3 in which the polyamide (B1) is PA6 or PA6,6.

7. The mixture according to claim 3, in which the polyolefin (B2) is an ethylene-alkyl (meth)acrylate-maleic anhydride copolymer.

8. The mixture according to claim 3, in which the polyolefin (B2) is a polymer comprising olefin units and functions allowing small polyamide chain or polyamide oligomer grafting, condensed with polyamides or monoamino polyamide oligomers.

9. The mixture according to claim 2 in which the polyamide (B1) is PA6 or PA6,6.

10. The mixture according to claim 2, in which the polyolefin (B2) is an ethylene-alkyl (meth)acrylate-maleic anhydride copolymer.

11. The mixture according to claim 2, in which the polyolefin (B2) is a polymer comprising olefin units and functions allowing small polyamide chain or polyamide oligomer grafting, condensed with polyamide or monoamino polyamide oligomers.

12. The mixture according to claim 1, in which the alloy B further comprises a component (B3) alloyed with (B2).

13. The mixture according to claim 12, in which the component (B3) is selected from the group consisting of polyolefins (A1); copolymers comprising polystyrene and polybutadiene sequences (SBS); copolymers comprising polystyrene and polyisoprene sequences (SIS); ethylene/propylene rubber (EPR) and ethylene/propylene/diene monomer rubber (EPDM).

14. The mixture according to claim 1, in which said matrix A and alloy B are present in A/B weight ratios of from 5/95 to 95/5.

15. The mixture according to claim 14, in which said matrix A and alloy B are present in A/B weight ratios of from 90/10 to 50/50.

16. The mixture according to claim 1, in which the polyolefin (B2) is a polymer comprising olefin units and functions allowing small polyamide chain or polyamide oligomer grafting, condensed with polyamides or monoamino polyamide oligomers.

17. The mixture according to claim 1, in which the dispersed phase is in the form of small platelets.

18. The mixture of claim 1, wherein said polyolefin (B2) is further reacted with a polyamide oligomer comprising an amino group.

19. A method for producing a mixture according to claim 1, characterized in that it comprises the step of mixing the constituents of matrix A and alloy B.

20. A multi-layer structure comprising a layer or film of the mixture according to claim 1.

21. A mixture comprising, on a weight ratio basis:
(i) from 90% to 50% of a first matrix A wherein the matrix A comprises from 100% to 75% by weight of polyolefin (A1) and from 0% to 25% by weight of polyolefin (A2) functionalized with at least one member of the group consisting of acid, anhydride and epoxy functions; and
(ii) from 10% to 50% of a phase in the form of platelets dispersed in the first matrix phase (i) comprising an alloy B wherein the alloy B comprises a second matrix comprising polyamide (B1) and a polyolefin (B2) dispersed therein, wherein said polyolefin (B2) is functionalized with at least one member of the group consisting of an acid function, an anhydride function, an epoxy function, and an amino function.

22. The mixture according to claim 21, in which the alloy B further comprises a component (B3) alloyed with (B2).

23. The mixture according to claim 21, in which the polyolefin (A1) is selected from polyethylene or polypropylene.

24. The mixture according to claim 23 in which the polyamide (B1) is PA6 or PA6,6.

25. The mixture according to claim 24, in which the polyolefin (B2) is an ethylene-alkyl (meth)acrylate-maleic anhydride copolymer.

26. The mixture according to claim 23, in which the polyolefin (B2) is an ethylene-alkyl (meth)acrylate-maleic anhydride copolymer.

27. The mixture according to claim 23, in which the polyolefin (B2) is a polymer comprising olefin units and functions allowing small polyamide chain or polyamide oligomer grafting, condensed with polyamides or monoamino polyamide oligomers.

28. The mixture according to claim 21 in which the polyamide (B1) is PA6 or PA6,6.

29. The mixture according to claim 28, in which the polyolefin (B2) is an ethylene-alkyl (meth)acrylate-maleic anhydride copolymer.

30. The mixture according to claim 28, in which the polyolefin (B2) is a polymer comprising olefin units and functions allowing small polyamide chain or polyamide oligomer grafting, condensed with polyamides or monoamino polyamide oligomers.

31. The mixture according to claim 21, in which the polyolefin (B2) is an ethylene-alkyl (meth)acrylate-maleic anhydride copolymer.

32. The mixture according to claim 21, in which the polyolefin (B2) is a polymer comprising olefin units and functions allowing small polyamide chain or polyamide oligomer grafting, condensed with polyamides or monoamino polyamide oligomers.

33. The mixture according to claim 21, in which the dispersed phase is in the form of small platelets.

34. The mixture of claim 21, wherein said polyolefin (B2) is further reacted with a polyamide oligomer comprising an amino group.

35. A method for producing a mixture according to claim 21, characterized in that it comprises the step of mixing the constituents of matrix A and alloy B.

36. A multi-layer structure comprising a layer or film of the mixture according to claim 21.

37. A mixture comprising a polyethylene first matrix A and a dispersed phase in the form of platelets dispersed in the first matrix, said dispersed phase comprising a polyamide alloy B, wherein said alloy B comprises a polyamide second matrix (B1), an ethylene-alkyl (meth)acrylate-maleic anhydride copolymer (B2), and polyethylene (B3).

38. A mixture comprising:
(i) a first matrix A comprising polyethylene (A1) wherein a functionalized polyolefin (A2) is not present in the first matrix; and
(ii) a phase in the form of platelets dispersed in the first matrix phase (i) comprising an alloy B wherein the alloy B comprises a second matrix comprising polyamide 6 (B1) and ethylene/alkyl (meth) acrylate/maleic anhydride terpolymer (B2) dispersed therein; and wherein the alloy B further comprises polyethylene (B3).

39. The mixture of claim 38 wherein the alkyl (meth) acrylate is an alkyl methacrylate.

* * * * *